United States Patent [19]

Nakatsukasa et al.

[11] Patent Number: 5,031,265
[45] Date of Patent: Jul. 16, 1991

[54] WIPER DEVICE FOR WIPING A VEHICLE WINDSHIELD

[75] Inventors: Tetsuya Nakatsukasa, Okazaki; Yoshiyuki Koumo, Toyohashi; Isao Ito, Handa; Nobuyoshi Takagi, Chiryu, all of Japan

[73] Assignee: Asmo Co., Ltd., Shizuoka, Japan

[21] Appl. No.: 323,372

[22] Filed: Mar. 14, 1989

[30] Foreign Application Priority Data

Mar. 15, 1988 [JP] Japan ................................. 63-61323
Mar. 18, 1988 [JP] Japan ................................. 63-66563

[51] Int. Cl.⁵ .............................................. B60S 1/06
[52] U.S. Cl. ............................... 15/250.13; 15/250.27; 15/250.30; 74/40; 74/42; 74/51
[58] Field of Search ............ 15/250.13, 250.16, 250.27, 15/250.29, 250.30, 250.34; 74/40, 42, 50, 51

[56] References Cited

U.S. PATENT DOCUMENTS

| | | | |
|---|---|---|---|
| 2,298,197 | 10/1942 | Coffey | 15/250.16 |
| 3,422,480 | 1/1969 | Kato | 15/250.30 |
| 4,264,997 | 5/1981 | Kolb et al. | 15/250.29 |
| 4,765,018 | 8/1988 | Buchanan | 15/250.13 |
| 4,787,114 | 11/1988 | Okudaira | 15/250.16 |

FOREIGN PATENT DOCUMENTS

| | | | |
|---|---|---|---|
| 46844 | 3/1982 | European Pat. Off. | 15/250.16 |
| 1816835 | 7/1969 | Fed. Rep. of Germany | 15/250.30 |
| 1906440 | 8/1970 | Fed. Rep. of Germany | 15/250.13 |
| 873409 | 3/1942 | France | 15/250.13 |
| 172856 | 10/1982 | Japan | 15/250.29 |
| 6054655 | 4/1960 | Japan . | |

*Primary Examiner*—Harvey C. Hornsby
*Assistant Examiner*—Mark Spisich
*Attorney, Agent, or Firm*—Birch, Stewart, Kolasch & Birch

[57] ABSTRACT

A wiper device including a wiper motor and two wiper blades for wiping a vehicle windshield comprises a reciprocally actuating coupling rod connected to the wiper motor by a crank arm, a swinging lever which is connected to the coupling rod so as to swing, a first wiper arm which is fixedly connected with one of the wiper blades and is swung with the swinging lever, a second wiper arm which is fixedly connected with another of the wiper blades and swings in tandem with the first wiper arm according to reciprocal movement of a link rod connected to the swinging lever, and a mechanism or enabling movement of linkage positions relative to the swinging lever, the coupling rod and the link rod, accompanied by a snap action.

2 Claims, 18 Drawing Sheets

WIPER DEVICE FOR WIPING A VEHICLE WINDSHIELD

BACKGROUND OF THE INVENTION

The present invention relates to a wiper device for wiping a vehicle windshield, and more specifically relates to the wiper device having a wiping angle switching function to protect the wiper from snow damage.

Conventional wiper devices have wiping angle switching functions such as that disclosed in Japanese Patent Application No. 60-54655. The wiper device comprises a rotating crank arm, a crank pin fixedly mounted on said crank arm, an eccentric bushing swingably mounted on said crank pin which has a center shaft that is eccentric to the center shaft of the crank pin, a wiper link rod which is mounted so as to be freely swingable relative to the eccentric bushing and actuated reciprocally according to rotation of the crank arm, a wiper blade which swings according to reciprocal actuation of said wiper link rod, and a lever which forms a single unit with the eccentric bushing and is swingable together with said eccentric bushing at the periphery of the crank pin, a slider which is freely slidable in the radial direction of the eccentric bushing when the lever is coupled with said eccentric bushing, said slider being fixedly coupled with said eccentric bushing on the wiper link rod side or crank arm side to change the wiper blade lower reversing position to two stages. The wiper device is installed in a cowl box. An access hole is provided in a fixed position of said cowl box and is covered with a rubber stopper. However, to switch the wiping angle in conventional wiper devices, the user must perform a troublesome series of switching operations such as stop the wiper blade at the upper reversing position, open an engine hood of the car, remove the rubber stopper of the access hole, and switch the fixed position of the sliding member to the wiper link rod's side or the crank arm's side using a screw driver. The switching operations become extremely difficult to perform during snowfall. When the wiper blade housed positon is packed with snow, the wiper blade conflicts with the packed snow before it reaches the lower reversing position, which is a distinct disadvantage from the standpoint of wiper device protection.

U.S. Pat. No. 4,264,997 which is granted in May 5, 1981 discloses a wiper device comprising a rotary output shaft, a wiper shaft connected with a wiping element, a swinging element for converting a rotational movement of the output shaft into a swinging movement of the wiper shaft, the swinging element which includes a crank member rotatably connected to the output shaft, a rocker arm connected with the wiper shaft, a connecting rod turnably connected with the crank member and the rocker arm, and a spring member for permitting swinging of the connecting rod even when the wiper shaft is restricted as a result of snow accumulation in a posterior area of the wiper shaft, for instance.

However, in order to exchange a blade rubber and clean a blade-housed position, the wiper blade must be pulled out from the housed position and be kept maintained in case of applying a structure of the conventional wiper device to a wiper device wherein a wiper blade is fully concealed under an engine hood. Moreover, a large current should undersirably flow in a wiper motor so as to swing the connecting rod against the spring member when the wiper shaft is restricted by the snow.

SUMMARY OF THE INVENTION

An object of the present invention is to provide a wiper device which automatically switches a wiping angle of a wiper blade when the snow accumulates in a wiper blade housed position.

A further object of the present invention is to provide a wiper device which allows switching of a wiping angle at one touch by applying a strong tractive force to a wiper arm.

Another object of the present invention is to provide a wiper device which allows safe operation of a wiper motor without a large current flow when the snow accumulates in a wiper blade housed position.

A construction of the wiper device of the present invention is characterized by providing a reciprocally actuating coupling rod connected to the wiper motor by a crank arm, a swinging lever which is connected to the coupling rod so as to swing, a first wiper arm which is fixedly connected with one of two wiper blades and is swung with the swinging lever, a second wiper arm which is fixedly connected with the other of the wiper blades and swings in tandem with the first wiper arm according to reciprocal movement of a link rod connected to the swinging lever, and means for enabling movement of linkage positions relative to the swinging lever, the coupling rod and the link rod, accompanied by a snap action.

According to the construction of the present invention, when a tractive force is applied to the link rod and the swinging lever begins to move, the swinging angle of the swinging lever is switched to move the linkage position of the swinging lever relative to the coupling and the link rods. Then, the angles are switched for the first and the second wiper arms and the wiping wiper blade in accordance with swinging of the swinging lever. The tractive force applied to the link rod may be derived from the wiper blade striking a snow packed into the wiper blade housed position, or can be the tractive force manually applied to the link rod. The magnitude of the tractive force required to switch the wiping angle is set to be suitably larger than the tractive force generated by the link rod via normal wiper operation.

The construction of the present invention is characterized in that the swinging lever is connected with the coupling rod by a coupling pin and a linkage position of the coupling pin relative to the swinging lever can be moved, accompanied by the snap action.

The construction of the present invention is characterized in that the swinging lever provides a slot in which the coupling pin is movably connected and the slot has an elastic member in a center thereof such that the slot is divided by the elastic member into two linkage holes, and the coupling pin can be stably connected in either of the linkage holes and can be moved between the linkage holes, accompanied by the snap action.

According to the aforesaid construction, the swinging angle of the swinging lever is switchable by means of a simple construction because when the swinging lever has a rotational force applied thereto by means of an additional tractive force applied to the link rod, the coupling pin which aligns with one of the two linkage holes in the slot is also connected to the other linkage hole accompanied by the snap action when an elastic force is applied through the elastic member provided in the slot.

The construction of the present invention is characterized in that the swinging lever includes the switching lever which is switchable two stable positions as well as fixedly connected with the coupling pin coupled with the coupling rod, and a slider which maintains the slidability of the switching lever with the swinging lever, such that the slider can move accompanied by the snap action relative to the swinging lever.

According to the construction, the swinging angle of the swinging lever is switched and reliable operation is assured because the slider slides from one fixed position to another when the swinging lever has a swinging force applied thereto by means of the tractive force applied to the link rod.

The construction of the present invention is characterized in that the swinging lever includes a first swinging lever, a second swinging lever and a movable member, the first swinging lever provides fixedly a pivot shaft being a swinging center thereof and is fixedly coupled with the first wiper arm through the pivot shaft and has the link rod for swinging the second wiper arm connected in a swinging end thereof, the second swinging lever is rotatably connected with the coupling rod by a swinging end thereof and is connected with a swinging end of the movable member, and the movable member can move relative to the first swinging lever; and wherein the second swinging lever has a support member providing a slot portion to insert the pivot shaft in a linkage portion with the pivot shaft of the first swinging lever, the support member provides an elastic member to apply an elastic force to the pivot shaft from both of substantially central sides of the slot portion, such that a position of the second swinging lever can be moved relative to the pivot shaft, accompanied by the snap action.

According to the construction of the present invention, because the first swinging lever stops when the tractive load is applied to the link rod, the second swinging lever is pushed by the coupling rod which is driven by the wiper motor and the distance is increased between the pivot shaft of the first swinging lever and the swinging center position of the second swinging lever when the elastic force is applied to the slot portion of the support. Therefore, the swinging angle of the first swinging lever decreases relative to same reciprocal actuation distance and the swinging angles of the first and the second wiper arms decreases, thereby decreasing the wiping angle of the wiper blades which are driven by said wiper arms.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

The accompanying drawings, which are incorporated in and constitute a part of this specification, illustrate several exemplary embodiments of the invention and together with the description, serve to explain the principles of the invention.

DESCRIPTION OF THE PREFERRED EMBODIMENTS

Figure 1:
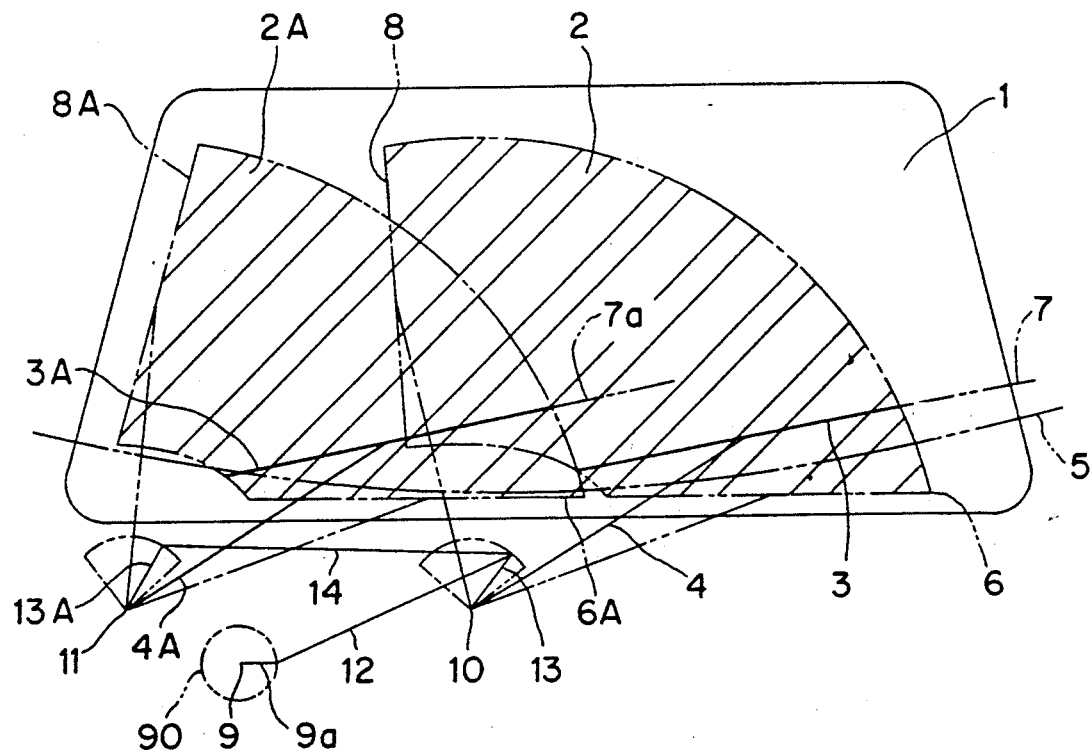
FIG. 1 is an illustration view of a construction of a wiper device according to a first embodiment of the present invention.

Next, several preferred embodiments of the present invention is described referring to the drawings.

(First Embodiment)

A first embodiment of the present invention is described hereinafter with reference to FIG. 1 through FIG. 4.

As shown in FIG. 1, a windshield 1 is wiped by wiper blades 3, 3A in wiping ranges 2 and 2A. The wiper blade 3 is coupled with a wiper arm 4, which in warm climates is fully concealed and wipes from lower reversing position 6 to upper reversing position 8, and in cold climates is semi-concealed and similarly wipes from lower reversing position 7 to upper reversing position 8. The lower reversing position 6 of the fully concealed mode is located downward from a posterior edge 5 of an engine hood, while the lower reversing position 7 of the semi-concealed mode is located upward from the posterior edge 5 of the engine hood. The region in the vicinity of the posterior edge 5 of the engine hood is where falling snow becomes packed because a groove is formed to house the wiper blade 3. The mechanism which makes the wiper blade 3 automatically switchable between lower reversing positions 6 and 7 is provided in a swinging lever 13 as described hereinafter. A coupling rod 12 is coupled with a rotation center 9 of a wiper motor 90 via a crank arm 9a. The rotational movement of the rotation center 9 is transmitted to the swinging lever 13 as a swinging movement through the coupling rod 12. The wiper arm 4 is fixedly connected to a passenger's side pivot shaft 10 located at the rotational center of the swinging lever 13 at a defined angle with the swinging lever 13. The windshield 1 is wiped by the wiper blade 3 which is swung through the wiper arm 4. A swinging movement from the swinging lever 13 is transmitted to a driver's side pivot shaft 11 through a link rod 14 and a swinging lever 13A, and a wiping area 2A of the windshield 1 is wiped by the wiper blade 3A which swings in tandem with a wiper arm 4A. Namely, because the rotation center 9 rotates and the coupling rod 12 is reciprocally actuated through the crank arm 9a when the wiper motor 90 is actuated, the swinging lever 13 is swung on the pivot shaft 10. The swinging movement of the swinging lever 13 is transmitted to the swinging lever 13A through the link rod 14 and the swinging lever 13A is swung on the pivot shaft 11. As illustrated in FIG. 1, when the crank arm 9a and the coupling rod 12 are lined substantially in a straight line, to close the wiper blades 3 and 3A, the wiper blades 3 and 3A reach the lower reversing positions 6 and 6A in the warm climates. In contrast thereto, when the crank arm 9a rotates by about 180° from the position illustrated in FIG. 1 to open the wiper blades 3 and 3A, the wiper blades 3 and 3A reach the upper reversing positions 8 and 8A. When the snow accumulates to the peripheral region of the posterior edge 5 of the engine hood in the cold climates, the snow prevents full swinging of the wiper blades 3 and 3A. Therefore, the crank arm 9A and the coupling rod 12 are lined substantially in the straight line without success, as illustrated in FIG. 1 and a large tractive force is applied to the link rod 14. A mechanism of the present invention enables automatic conversion of the lower reversing positions 6 and 6A of the wiper blades 3 and 3A into the lower reversing positions 7 and 7A located upward of the posterior edge 5 of the engine hood.

A detailed description of the construction of the first embodiment follows hereinafter with reference to FIGS. 2 through 4. The link rod 14 is connected to the swinging lever 13 by a fixed pin 17 fixedly provided in the swinging lever 13. The swinging lever 13 has a support 15 provided which has a slot 15a comprising two centrally overlapping circular linkage holes. The support 15 has compression holes 15b located on the center of both sides of the slot 15a. A coupling pin 16 is seated in the linkage hole on one side of the slot 15a of the support 15, said coupling pin 16 having the coupling rod 12 connected thereto. The swinging lever 13 is driven by the coupling rod 12 and swings on the pivot shaft 10. The support 15 comprises an elastic member made of synthetic resin or like material provided with the compression holes 15b and is a center portion flexed only when the load on the coupling pin 16 is increased so that the coupling pin 16 is moveable from either of the two linkage holes in the slot 15a to the other accompanied by the snap action. When viewing the center of the two linkage holes in the slot 15a in the direction of linkage it can be seen that when the swinging lever 13 is at the upper reversing position on the open side, the linkage portion of the coupling rod 12 and the crank arm 9a is centered on center line 0, as described by the dotted line in FIG. 3, and the length RL of the coupling rod 12 becomes the working radius of the circle described by the coupling rod. Further, the center of each of the dual linkage holes of the slot 15a is located at the intersection of the center angle line ½Δθp of the switching angle for the swinging lever 13 and the aforesaid radius RL.

The construction of the swinging lever 13 is described hereinafter with reference to FIG. 4 which shows the 4—4 cross section of FIG. 3. The swinging lever 13 has the support 15 having the slot 15a. The slot 15a is a modified slot comprising two centrally overlapping linkage holes. The compression holes 15b are disposed at either side of the center of the slot 15a, and are compressed by the coupling pin 16 when passing from one linkage hole to the other. The coupling pin 16 has a collar portion 16a, said collar portion 16a being seated in a stepped portion 15c of the support 15. A slip-stop plate 18 is fixedly caulked at the bottom of the coupling pin 16, such that the swinging lever 13 and the support 15 are disposed medially between the stepped portion 15c and the slip-stop plate 18. The coupling pin 16 may be supported on the swinging lever 13 via a screw stop, clip or like device. The swinging lever 13 and the slip-stop plate 18 have a thrust-check washer and a web washer 19 disposed therebetween. It is preferred that the washer 19 be constructed by a friction reducing process to derive suitable sliding characteristics.

Figure 2:
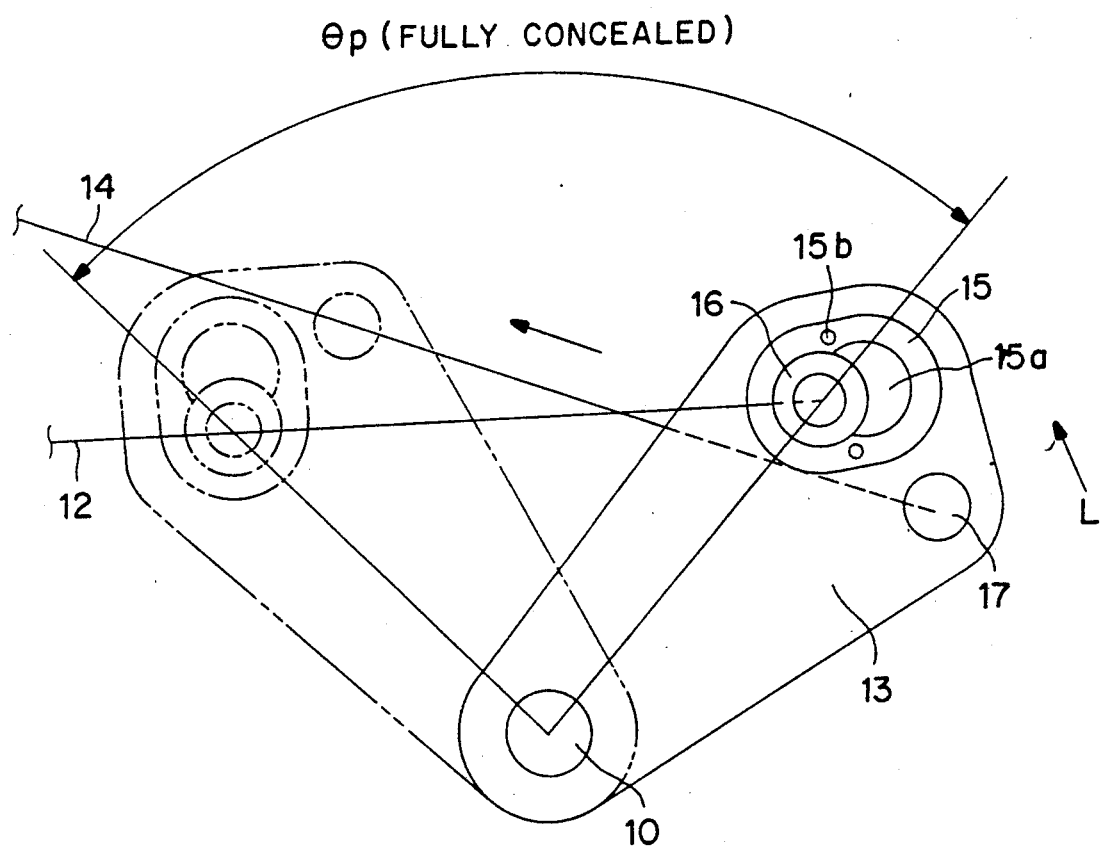
FIG. 2 is an illustration view illustrating a fully concealed mode of a swinging lever portion of the first embodiment.
Figure 3:
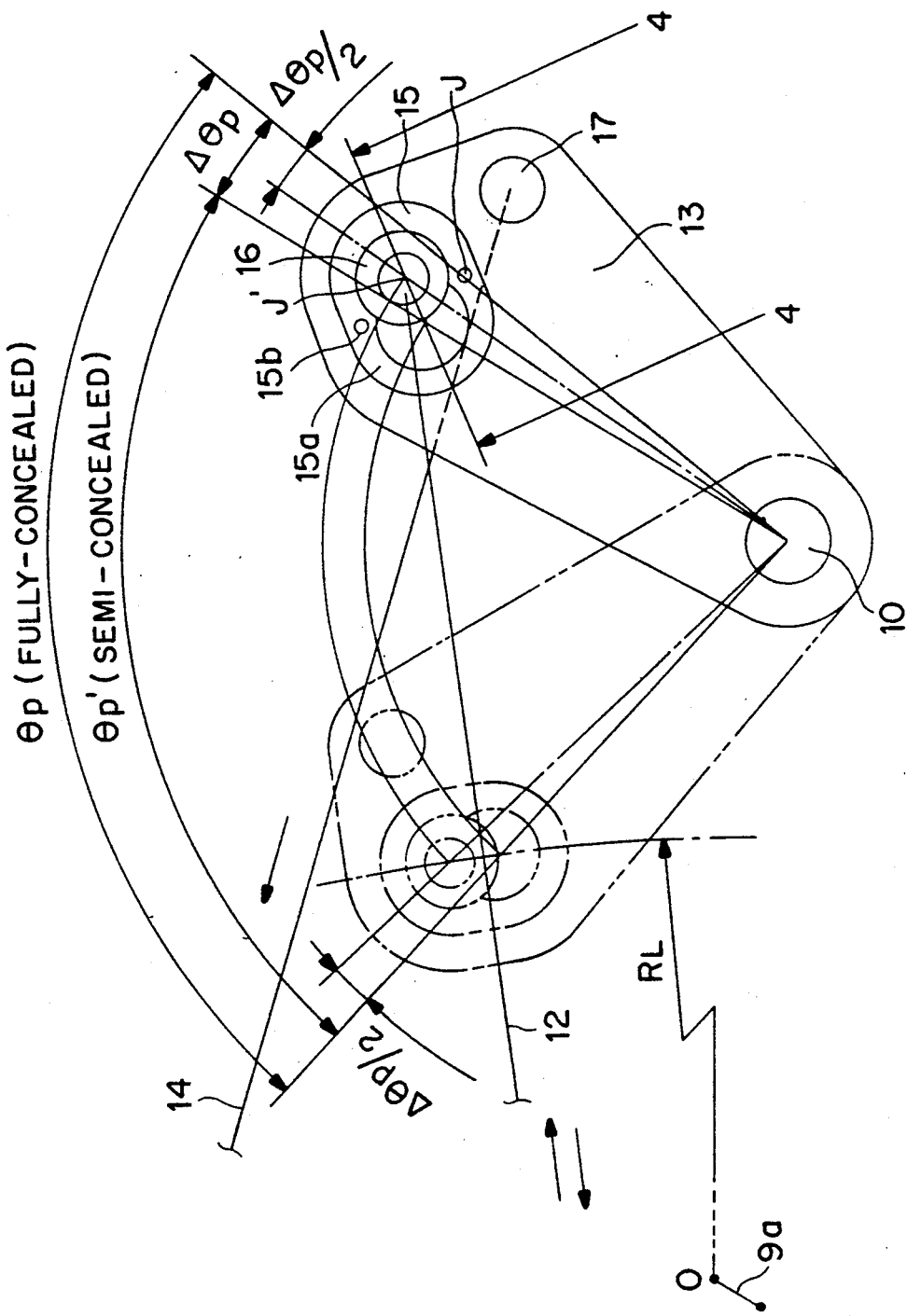
FIG. 3 is an illustration view illustrating a semi-concealed mode of the swinging lever portion of the first embodiment.
Figure 4:
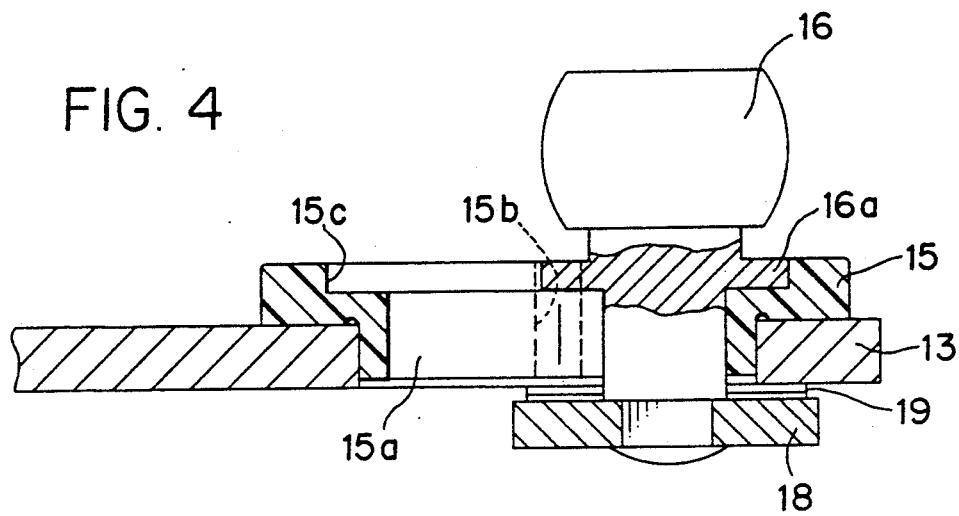
FIG. 4 is an 4—4 cross section view of the device shown in FIG. 3.

Next, an actuation of the first embodiment is described with particular reference to FIGS. 2 and 3.

FIG. 2 illustrates the fully concealed state. The coupling pin is inserted in the linkage hole nearest the passenger's side pivot shaft 10 in the slot 15a. During snowfall, when the snow becomes packed in the vicinity of the posterior edge 5 of the engine hood as shown in FIG. 1, when the wiper blades 3 and 3A come to a closed side in the right as illustrated in FIG. 1 due to actuation of the link rod 14, the wiper blades 3 and 3A hit the packed snow and are prevented from reaching the lower reversing positions 6 and 6A. When the wiper blades 3 and 3A abut the packed snow therefore, a load is imparted thereto. Thus, a large load is added to the link rod 14 through the wiper blade 3A, the wiper arm 4A and the swinging lever 13A. The link rod 14 is connected to the swinging lever 13 by the fixed pin 17 so as to rotate the swinging lever 13 on the pivot shaft 10 in the counterclockwise direction indicated by an arrow L as illustrated in FIG. 2. Then, the coupling pin 16 is pushed by the coupling rod 12 so as to be inserted into the other linkage hole of the slot 15a accompanied by the snap action due to counterforce induced by rotation of the swinging lever 13 in the counterclockwise direction. FIG. 3 shows the aforesaid condition. The result of the aforesaid operation is that the distance is increased between the pivot shaft 10 and the coupling pin 16, so that the swinging angle of the swinging lever 13 becomes smaller relative to the coupling rod 12 which maintains the same distance of reciprocating movement. The wiping angle of the wiper blade 3 is therefore switched through the wiper arm 4 from θp (fully concealed) to θp' (semi-concealed) which is smaller than θp, and the lower reversing position 6 of the wiper blade 3 is thus switched to the lower reversing position 7 of $\Delta\theta p$ less angle. The switching angle $\Delta\theta p$ is expressed by the equation below.

$$\Delta\theta p = \theta p - \theta p'$$

(Second and Third Embodiments)

Figure 5:
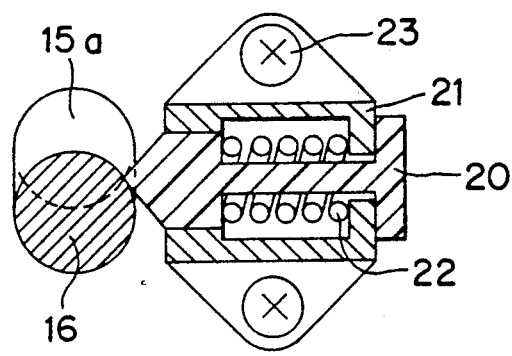
FIGS. 5 and 6 are cross section views of a second and third embodiment of the present invention.
Figure 6:
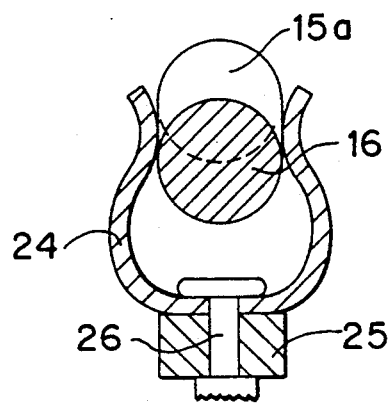

Another construction wherein the coupling pin 16 is moveable by the swinging lever 13 accompanied by the snap action is shown in FIGS. 5 and 6 as a second embodiment and a third embodiment of the invention. In the first embodiment, the load was adjusted when the coupling pin 16 was moved by constructing the support 15 of a synthetic resin member, but pressure may also be applied to the center portion of the slot 15a by a fixing guide pin 20 which applied pressure via a compression spring 22 in the second embodiment as illustrated in FIG. 5. The fixing guide pin 20 has a substantially V-shaped tip and is maintained by a holder 21 which is fixedly mounted to the swinging lever 13 by a locking screw 23 so as to apply pressure in the direction of the coupling pin 16. When a load is applied to the swinging lever 13 by the link rod 14, the guide pin 20 slides so as to render the coupling pin 16 moveable accompanied by the snap action within the slot 15a. The third embodiment is illustrated in FIG. 6 which illustrates a brief view of a construction wherein the coupling pin 16 is maintained by a U-shaped spring plate 24. The powerful plate spring 24 is fixedly mounted to a rising portion 25 of the swinging lever 13 by a rivet 26, so as to maintain the coupling pin 16 in the center of the slot 15a, accompanied by the snap action. The rising portion 25 may also be a separate member fixedly attached to the swinging lever 13. The tractive load added to the link rod 14 may also be generated by strong manual upward pulling of the wiper blade 3A in illustration of FIG. 1, during stopping of the wiper blade 3A.

(Fourth Embodiment)

A construction of a fourth embodiment is described hereinafter with reference to FIG. 7 through FIG. 9 and FIG. 1.

Figure 9:
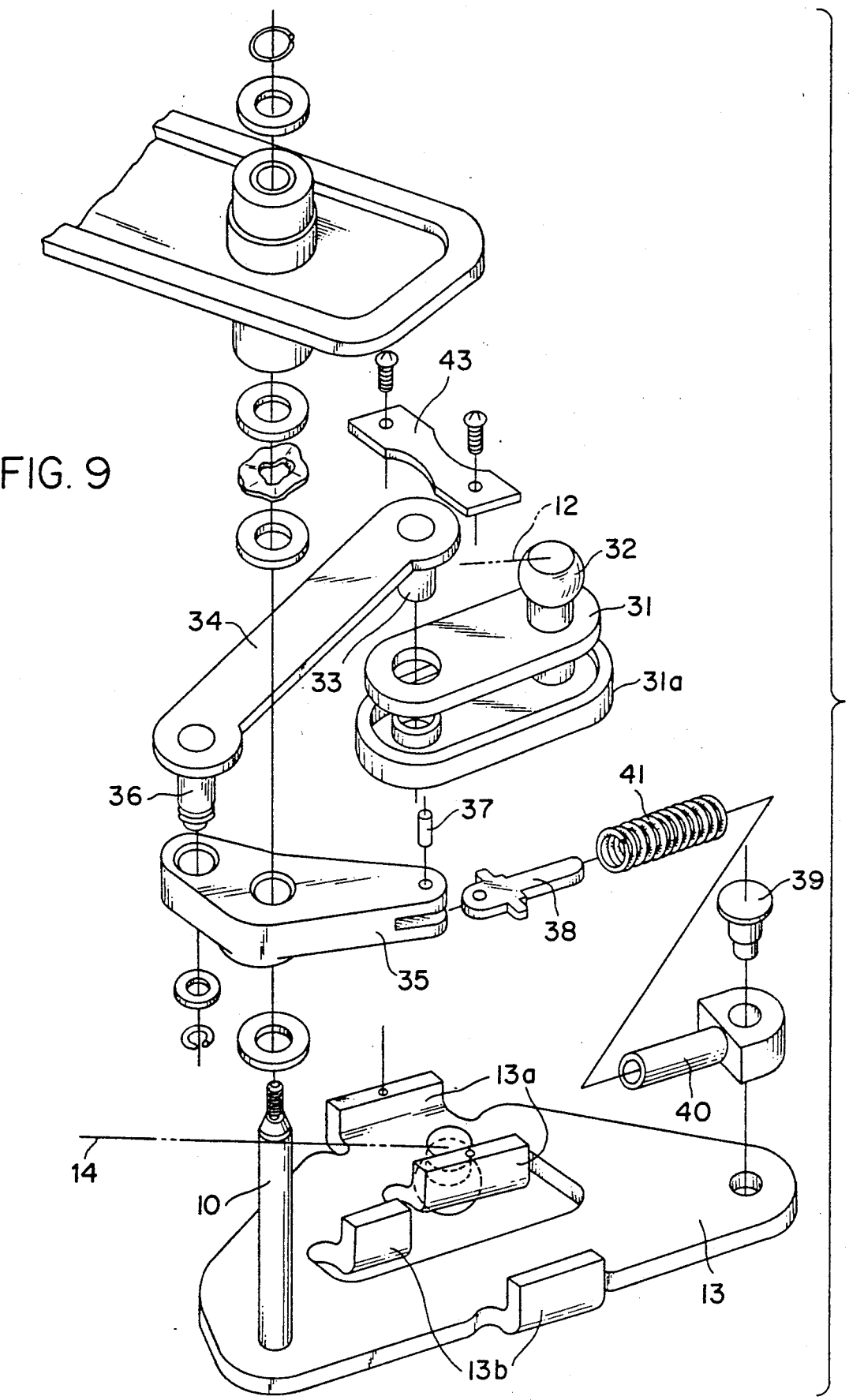
FIG. 9 is an exploded perspective view of the construction of the swinging lever portion of the fourth embodiment.

In the fourth embodiment, a link rod 14 is connected to a swinging lever 13 by a fixed pin 30. Two guides 13a rising from the swinging lever 13 slidably maintain a slider 31 therebetween. As shown in FIG. 9, the slider 31 is inserted in a case 31a which is constructed of slippery synthetic resin or like material. The slider 31 is connected to a coupling rod 12 by a coupling pin 32. A sub-rod 34 is fixedly mounted to another pin shaft 33 rotatably inserted in the slider 31. The sub-rod 34 is rotatably coupled by a pin shaft 36 with a switching lever 35 which has a support point being a pivot shaft 10 of the swinging lever 13. A spring guide 38, which is rotatably coupled with the switching lever 35 by a retaining pin 37, is slidably inserted into another spring guide 40 which freely swings on a pin shaft 39 fixedly attached to the swinging lever 13, said spring guides 38 and 40 having a compression spring 41 disposed therebetween. A switching range of the switching lever 35 is determined by two stoppers 13b rising from the swinging lever 13. The slider 31 is slidably mounted medially to the guides 13a by a cap plate 43 in the upper portion of the construction, as shown in FIG. 9.

Figure 7:
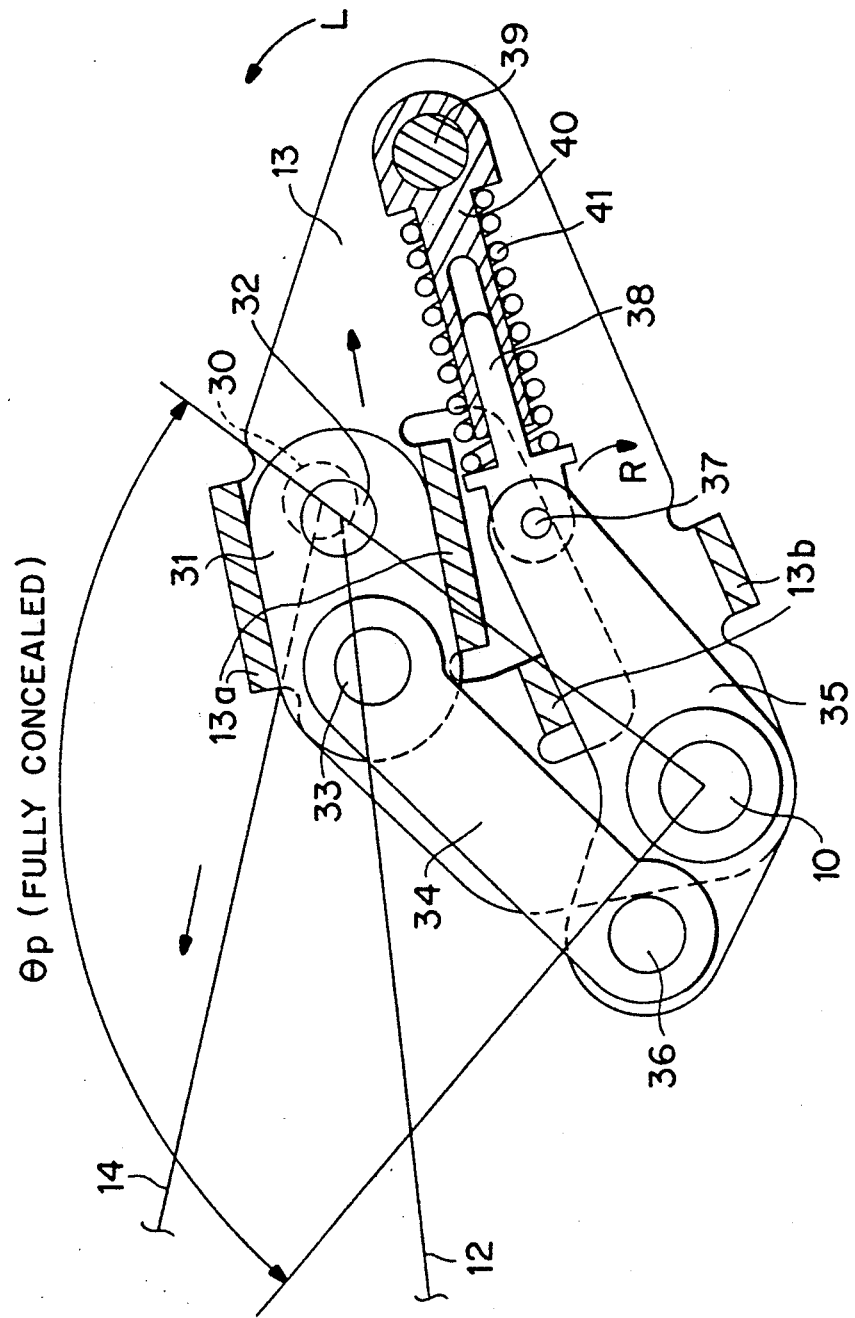
FIG. 7 is an illustration view illustrating the fully concealed mode of the swinging lever portion of fourth embodiment of the invention.
Figure 8:
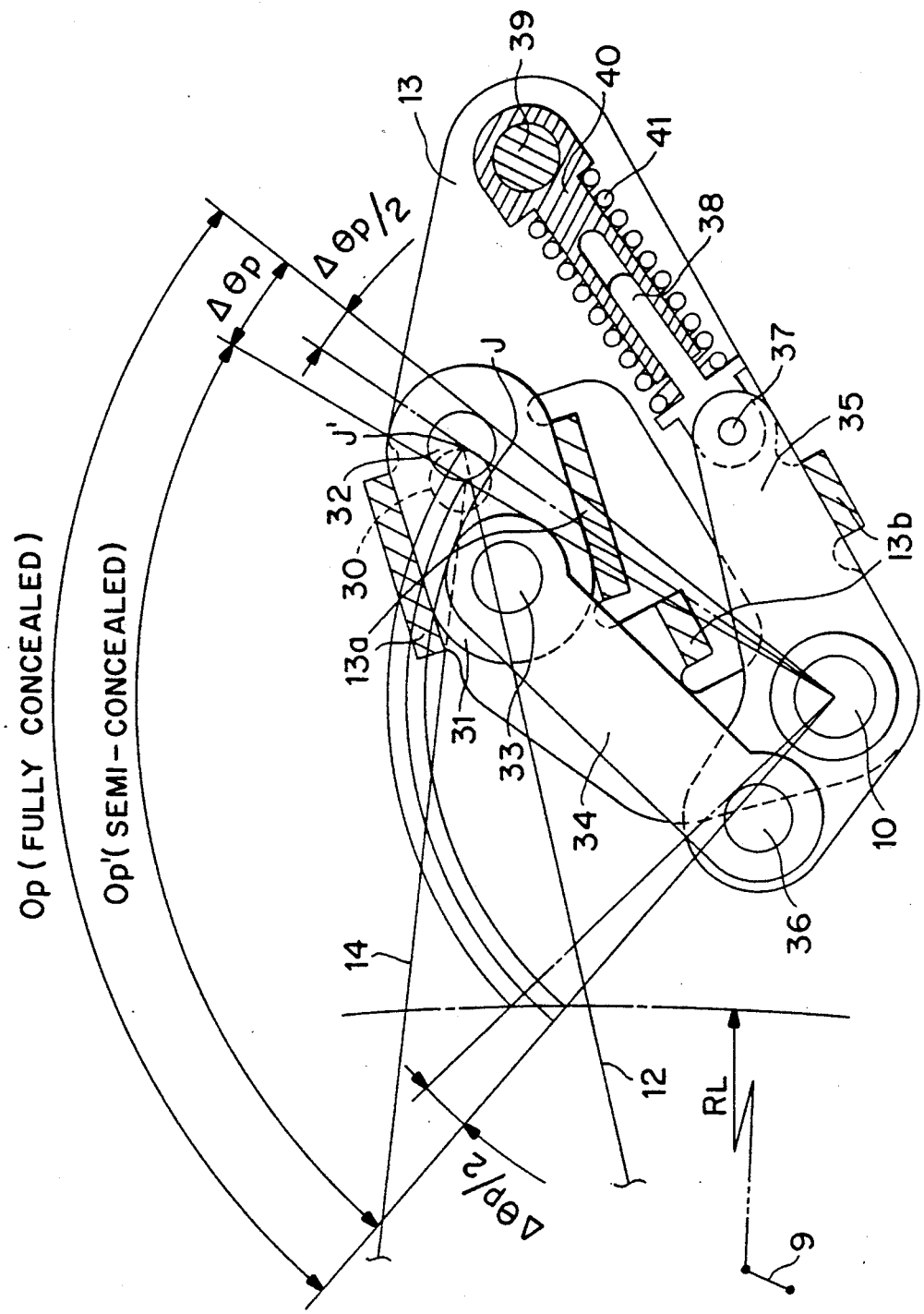
FIG. 8 is an illustration view illustrating the semi-concealed mode of the swinging lever portion of the forth embodiment.

In the construction, fully concealed configuration during warm climates, the swinging lever 13 is in the condition in which the coupling pin 32 is near in the left of the fixed pin 30 as described in FIG. 7. When the wiper is in the fully concealed state during cold weather conditions and snow accumulates to a peripheral region of a posterior edge 5 of an engine hood, as shown in FIG. 1, a tractive load applied to the link rod 14 is increased through a wiper arm 4A as a wiper blade 3A hits the packed snow in mid-wiping motion due to actuation on a closed side of a coupling rod 12 while approaching the lower reversing position 6 of the fully concealed mode. The swinging lever 13 is rotated on a pivot shaft 10 in the counterclockwise direction L shown in FIG. 7 by the tractive load added to the link rod 14 through the fixed pin 30. When the swinging lever 13 is swung in the counterclockwise direction, the slider 31 is acted upon by a counterforce which pushes to the right in FIG. 7 through the coupling rod 12 and the coupling pin 32 so as to slide which being guided by the guides 13a. The sub-rod 34 is simultaneously pulled to the right in FIG. 7 by the slider 31 via the pin shaft 33, the switching lever 35 is rotated about the pivot shaft 10 in the clockwise direction R via the pin shaft 36, and the switching lever 35 is rotated while it pushes upon and compresses the compression spring 41 disposed medially to the spring guides 38 and 40. Then, when the switching lever 35 is rotated through the line connecting the pivot shaft 10 and the pin shaft 39, said switching lever 35 is thrust against a bottom stopper 13b accompanied by a snap action by a reactive force of the compression spring 41 and stopped, as shown in FIG. 8. Thus, the slider 31 is moved accompanied by the snap action in the right as illustrated in FIG. 8 by rotation of the switching lever 35 such that the distance is increased between the pivot shaft 10 of the swinging lever 13 and the coupling pin 32 at the tip of the slider 31. Therefore, the swinging angle of the swinging lever 13 is reduced relative to the same reciprocal stroke of the coupling rod 12 connected to the coupling pin 32, and the wiping angle $\theta p$ of the wiper blades 3 and 3A of the fully concealed mode is automatically switched to the wiping angle $\theta p'$ of the semi-concealed mode.

The slide distance and direction moved by the coupling pin 32 connected to the coupling rod 12 which is induced by the sliding movement of the slider 31 is identical to the slide distance and direction of the coupling pin 16 as described through FIG. 3.

(Fifth Embodiment)

Figure 10:
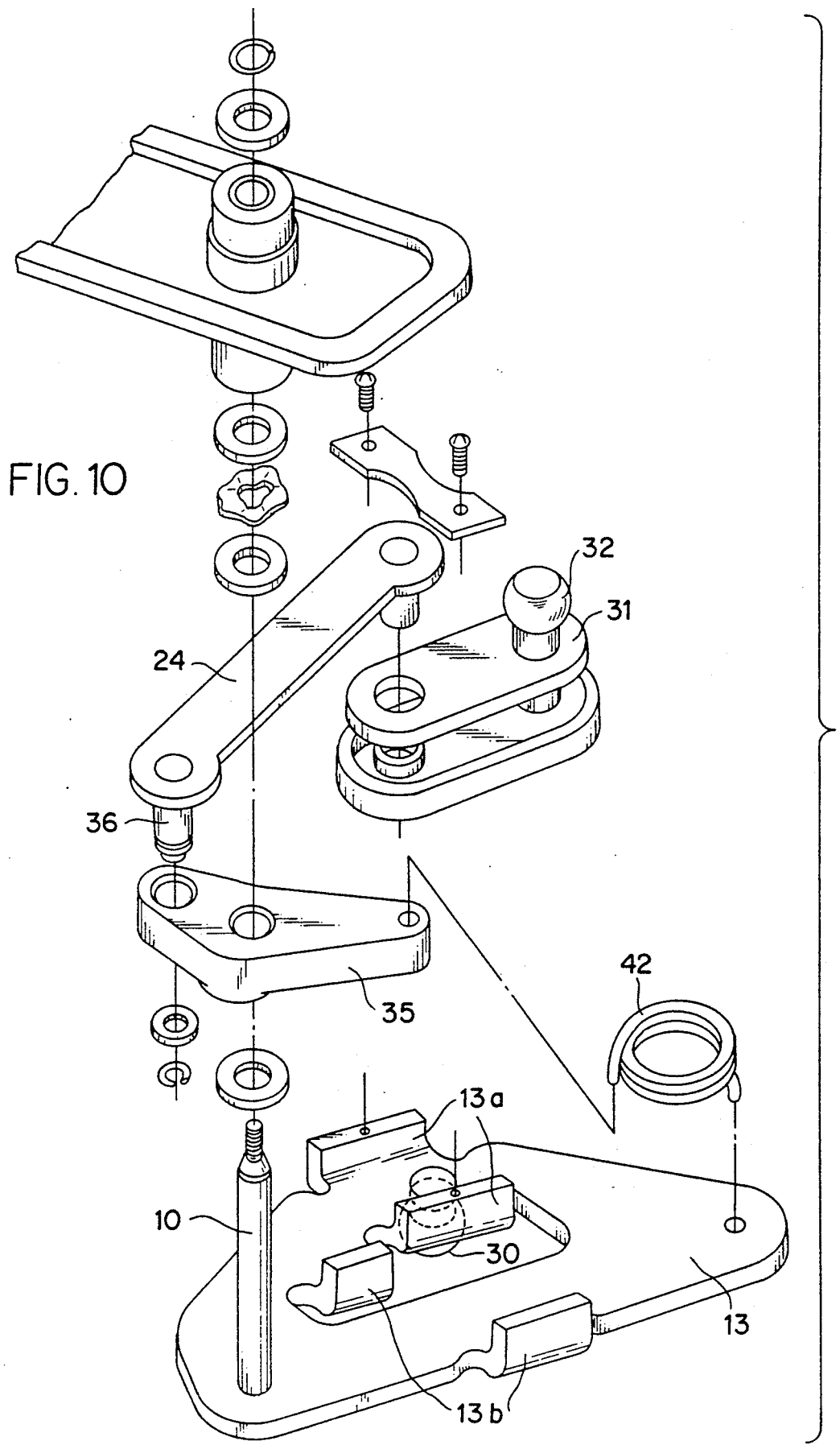
FIG. 10 is an exploded perspective view of a fifth embodiment of the invention.

In the fourth embodiment shown in FIG. 7 through FIG. 9, the switching lever 35 thrusts against and compresses the compression spring 41 as it switches the operating position, but the operating position of the switching lever 35 may also be switched using another elastic member, for example, a construction employing a coiled spring 42, as the fifth embodiment shown in FIG. 10.

Thus, by the construction from the first to the fifth embodiment, when an additional tractive load is applied to the link rod either manually or by the impact of the wiper blade on the snow accumulated in the housed position of the wiper blade, the swinging angle of the swinging lever is automatically switched by movement of the linkage position of the coupling pin in the swinging lever. The present invention therefore provides the wiper device which can very readily switch the wiping angle of the wiper blade, and has an excellent effect of providing powerful and complete protection of the wiper device because the wiping angle is switched automatically.

(Sixth Embodiment)

Referring to FIG. 11 to FIG. 15 and FIG. 1, a sixth embodiment of the present invention is described.

Figure 11:
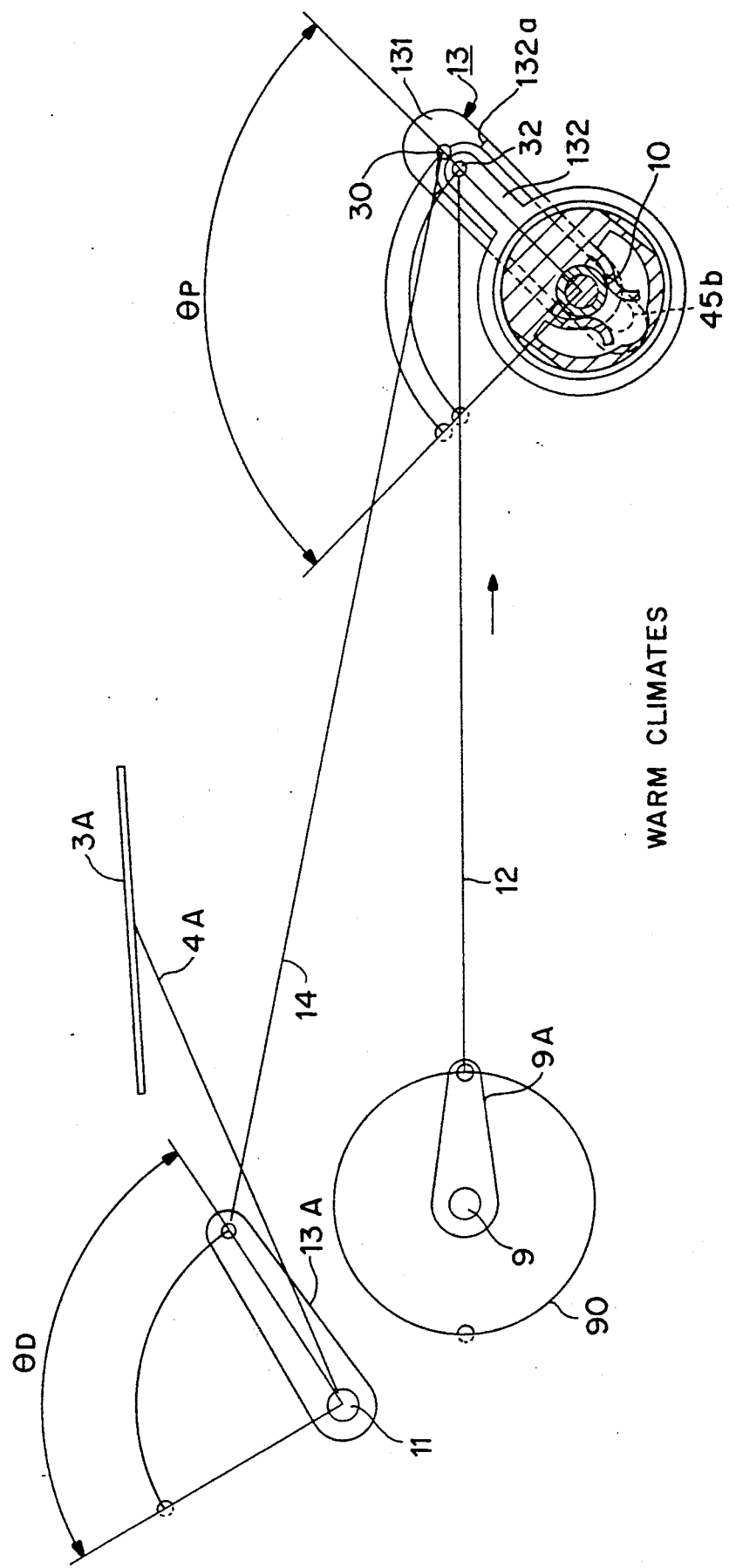
FIG. 11 is a typical view illustrating the fully concealed mode in warm climates of the wiper device of a sixth embodiment of the present invention.
Figure 12:
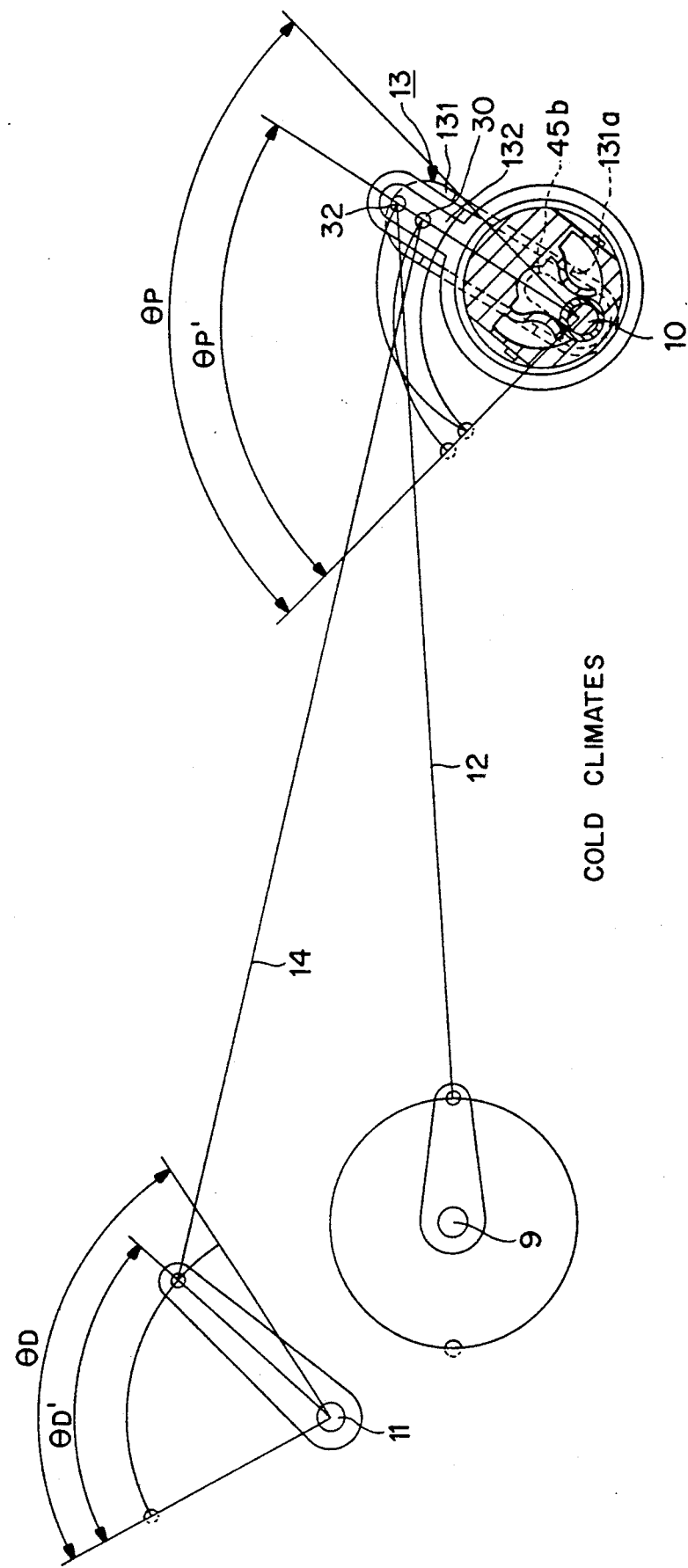
FIG. 12 is a typical view illustrating the semi-concealed mode in cold climates.

Referring to FIGS. 11 and 12, there is shown hereinafter a switching mechanism for the warm and the cold climates of the sixth embodiment.

In the sixth embodiment, a swinging lever 13 includes a first swinging lever 131 and a second swinging lever 132. FIG. 11 illustrates a fully concealed mode in the warm climates. The switching mechanism of the sixth embodiment is provided in a peripheral area of a passenger's side pivot shaft 10. A passenger's side $\theta p$ and a driver's side $\theta D$ are both wiping angles in the fully concealed mode. When the driver's side wiper arm 4A has a load applied thereto upward in illustration of FIG. 11 by the snow or a hand, a tractive load is added to a link rod 14, thereby preventing swinging of the first swinging lever 131 of a passenger's side swinging lever 13. Then a coupling rod 12 receives a force in the right is illustration of FIG. 11 from a wiper motor 90 through a crank arm 9A and pushes up the second swinging lever 132 toward the upper right in FIG. 12. As a result thereof, the second swinging lever 132 slides on the first swinging lever 131 and the fully concealed mode changes into the semi-concealed mode in the cold climates as illustrated in FIG. 12.

Figure 13:
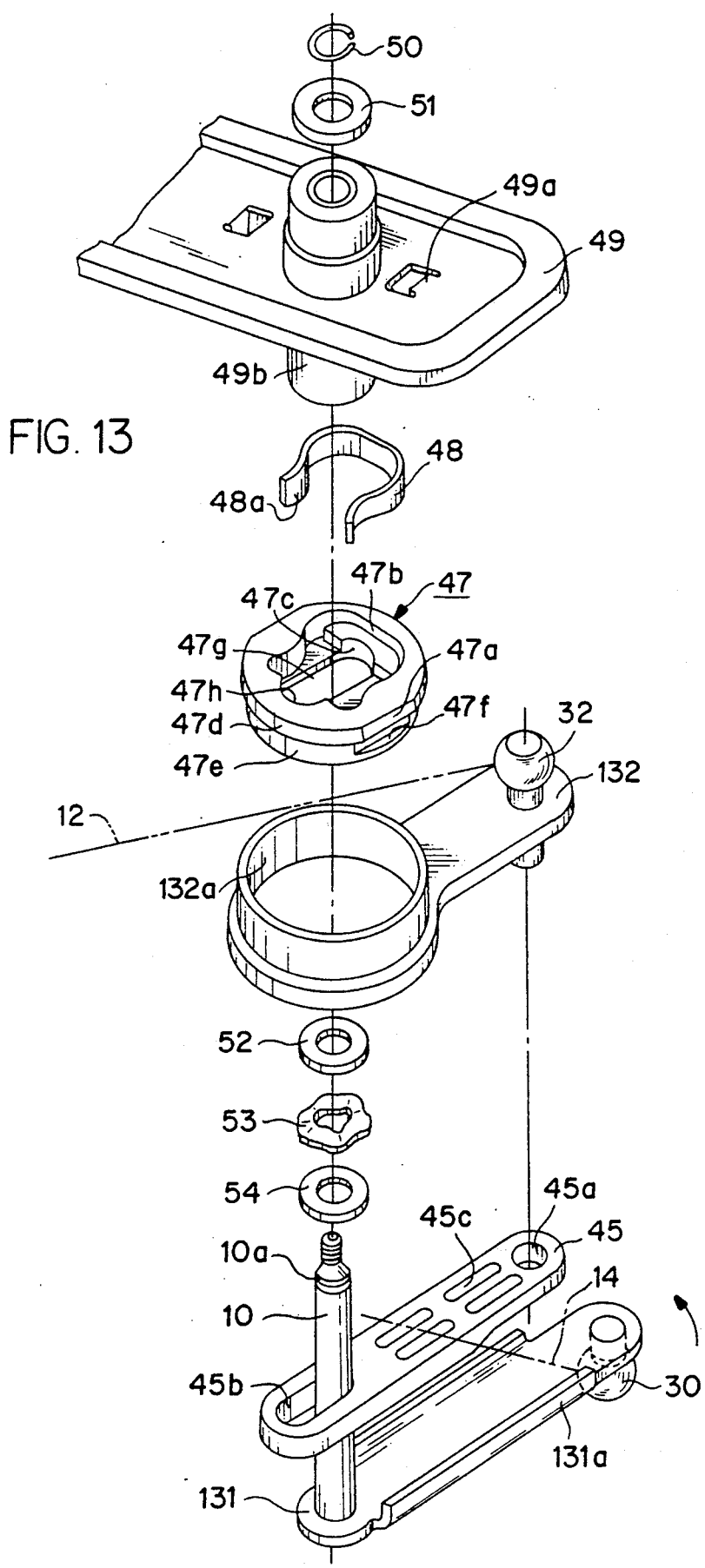
FIG. 13 is an exploded perspective view illustrating structure parts and the construction of the wiper device of the sixth embodiment.
Figure 14:
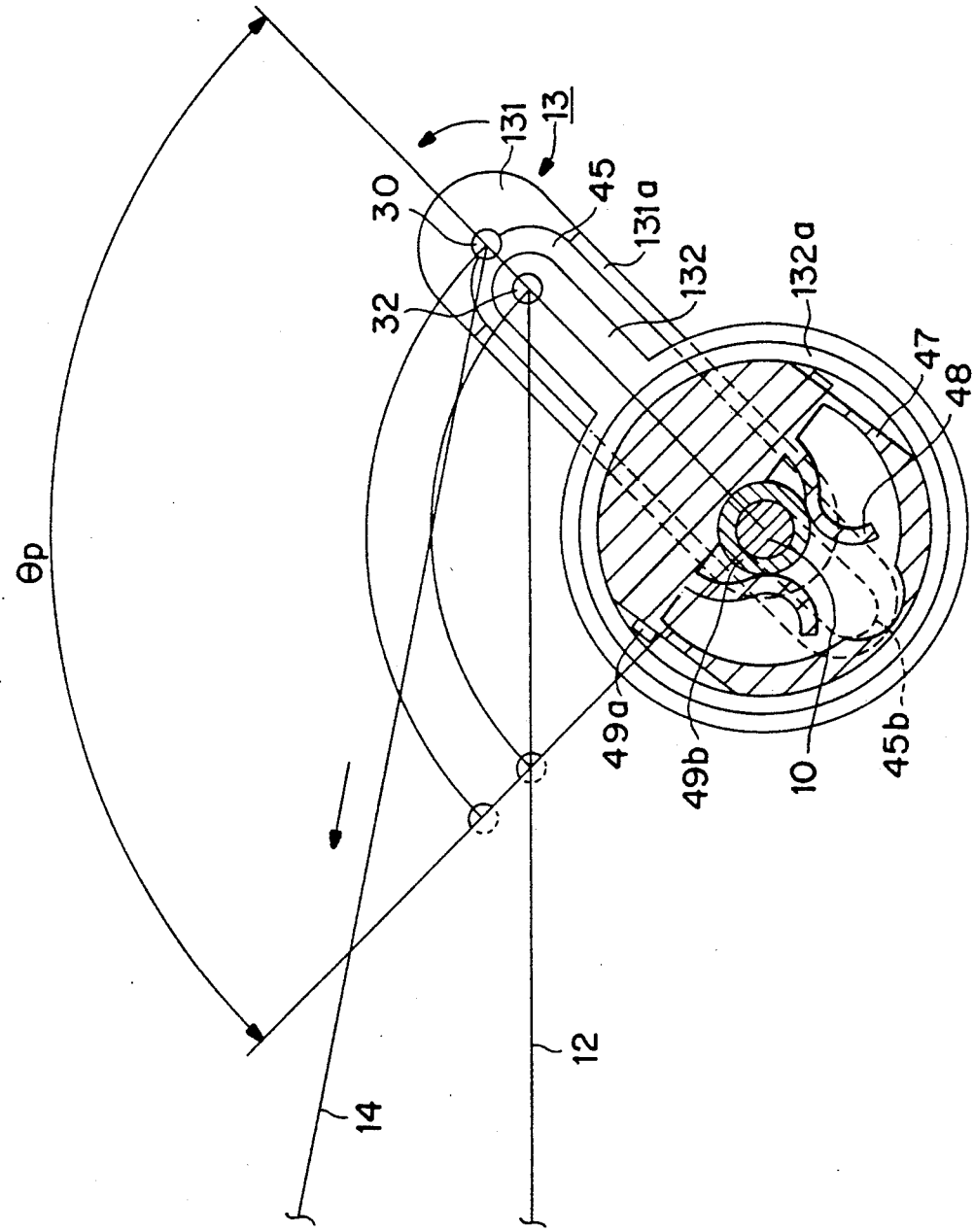
FIG. 14 is a partly sectional plan view illustrating the fully concealed mode around a pivot shaft in the sixth embodiment.
Figure 15:
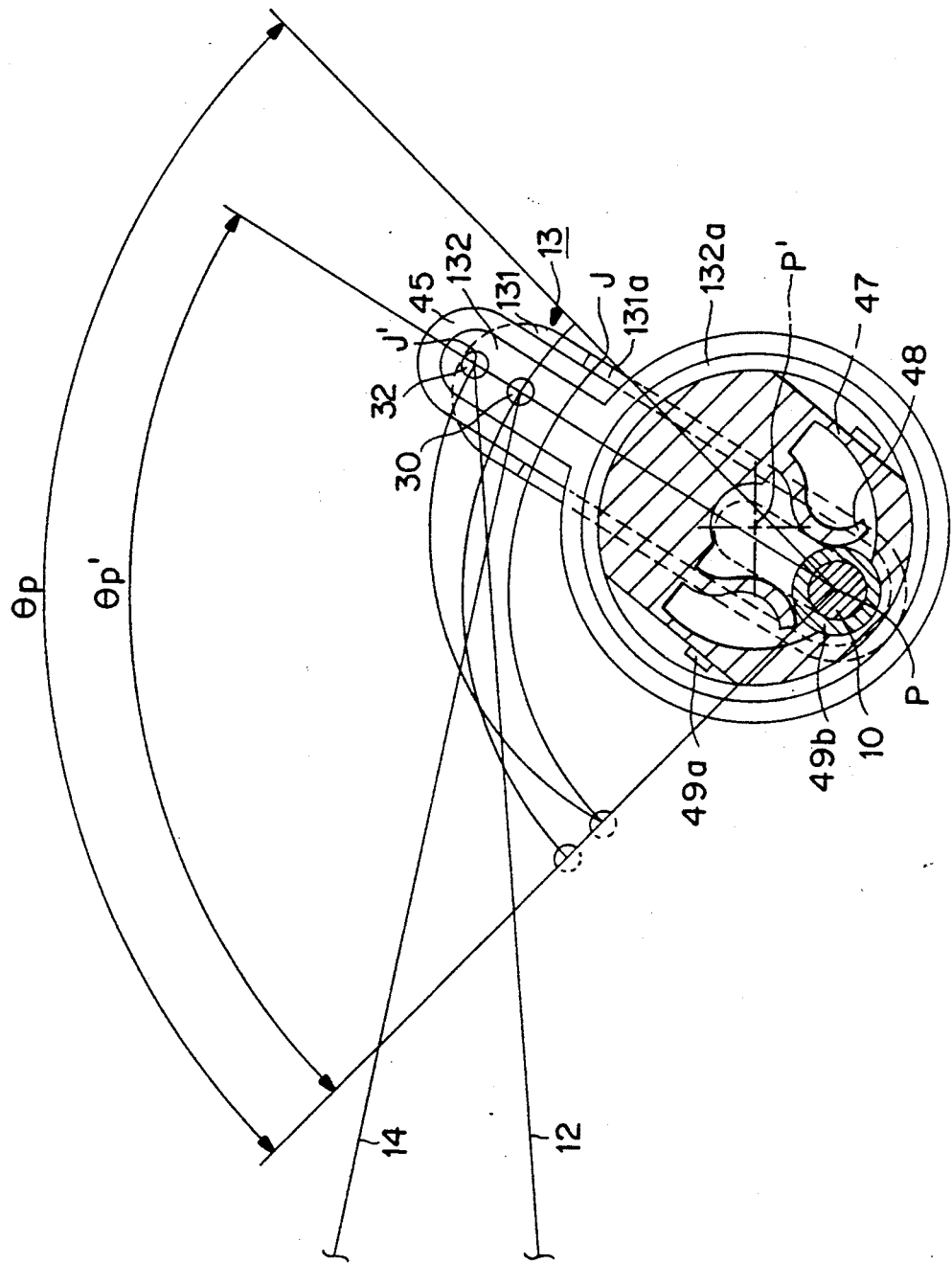
FIG. 15 is a partly sectional plan view illustrating the semi-concealed mode around the pivot shaft in the sixth embodiment.

Referring to FIGS. 13 to 15, the sixth embodiment is detailed.

In FIG. 13, structural parts and a construction are explained first.

The first swinging lever 131 is fixely provided at the passenger's side pivot shaft 10. A fixed pin 30 which is free relative to the link rod 14 is fixedly connected to an end side of the first swinging lever 131. A slider 45 is placed on the first swinging lever 131. The slider 45 is transversely limited by a side stopper 131a. A slot 45b is provided at an end of the slider 45 and is set in the pivot shaft 10. The slider 45 can slide only in a permitted range of pitch. A hole 45C is provided in a middle portion of the slider 45 to lighten the slider 45 and reservoir grease. The slider 45 should be preferably manufactured with materials such as plastic so as to slide well. Good-sliding materials such as metals also may be used instead of the plastic. The other end of the slider 45 is rotatably connected by a hole 45a with a coupling pin 32 connected to the second swinging lever 132. The coupling pin 32 is fixedly inserted into the second swinging lever 132 so as to project upward and downward from the second swinging lever 132. The coupling rod 12 is rotatably connected to the pin portion projecting upward. The coupling pin 32 also may be separated so that two pins are provided in the second swinging lever 132. The second swinging lever 132 forms a single unit with a cylindrical holder 132a. An annular sliding portion 47e of a support 47 is inserted into the holder 132a. The support 47 has a grease reservoir 47f formed therein by a notch of a part of the sliding portion 47e and a water-proof cover 47d of collar shape formed in an upper portion thereof. The support also has a groove 47b to put a C-shaped plate spring 48 in and a slot portion 47g. A curved portion 48a of the plate spring 48 is medially positioned in the slot portion 47g. A cylindrical holder portion 49 attached to the passenger's side holder body 49 formed like a plate is inserted into the slot portion 47g of the support 47 and is stably restrained in one stopper portion 47c and another stopper portion 47h by the curved portion 48a of the plate spring 48. Two stopper portions 49a are rising from the holder body 49. A movement of the support 47 is limited in parallel with a line connecting points P and P' in illustration of FIG. 15 by stopper faces 47a provided in the water-proof cover 47d by a notch of two faces. A thrust of the support 47 inserted into the second swinging lever 132 is adjusted by thrust washers 52 and 54 and wave washer 53. The support 47 is sandwiched between an upper surface of a slider 45 and an under surface of the holder body 49, and is slidably mounted through a flat washer 51 by a snap spring 50 inserted into a groove 10a which is provided at an end of the pivot shaft 10.

An actuation of the sixth embodiment is described hereinafter.

In illustration of FIG. 1, when the snow accumulates in the peripheral area of the pasterior edge of an engine hood 5 during snow fall, the snow restricts downward movement of a wiper blade 3A and the link rod 14 has a tractive force applied thereto by right movement on the closed side of the coupling rod 12. As illustrated in FIGS. 13 and 14, the first swinging lever 131 connected to the link rod 14 by the fixed pin 30 begins to rotate in the counterclockwise direction, thereby a counterforce is applied to the slider 45 whose sliding direction is limited by side stoppers 131a. Because the slider 45 is connected with the second swinging lever 132 and the coupling rod 12 by the fixed pin 32, the slider 45 slide in the direction in which the coupling rod 12 stretches centering a linkage portion of the coupling rod 12 with a crank arm 9a. Thereby, the second swinging lever 132 connected to the slider 45 by the coupling pin 32 is pulled by the slider 45 and the holder 132a moves with the support 47. Therefore, a rotation center changes from point P into point P' in illustration of FIG. 15. The point P corresponds with a swinging center of the pivot shaft 10 and a distance between the points P and P' is determined by the slot portion 47g. After movement of the holder 132a, a holder portion 49b is restrained by the plate spring 48 on the side of the stopper portion 47h of the slot portion 47g, accompanied by the snap action, in illustration of FIG. 13. Therefore, the rotation center of the second swinging lever 132 is fixed in the point P' in illustration of FIG. 15. Because a distance is increased from the center of the pivot shaft 10 being the rotation center of the first swinging lever 131 to the center of the coupling pin 32 provided in the second swinging lever 132, the swinging angle of the first swinging lever 131 is switched from $\theta p$ for the fully concealed mode to $\theta p'$ for the semi-concealed mode so as to be a small angle and a terminal of the center position of the coupling pin 32 connected to the coupling rod 12 moves from point J to point J' in illustration of FIG. 15. Namely, the first swinging lever 131, the slider 45 and the second swinging lever 132 rotate on the point P in the fully concealed mode in the warm climates, whereas only the second swinging lever 132 rotate on the point P' in the semi-concealed mode in the cold climates. The slider 45 which is positioned between the first swinging lever 131 and the second swinging lever 132 swings on the point P in accordance with swinging locus of the coupling pin 32 of the second swinging lever 132, therefore the slider 45 swings with the first swinging lever 131 while sliding.

(Seventh Embodiment)

Structural parts and a structure of a seventh embodiment are hereinafter described in accordance with FIG. 16.

In the seventh embodiment, the first swinging lever 131 is substantially triangulated, and the passenger's side pivot shaft 10 is provided at a vertical angle of the lever 131 and the fixed pin 30 is fixedly attached to another vertical angle so as to be connected with the link rod 14, and a pin shaft 60 is fixedly attached to a substantially central vertical angle. Furthermore, the first swinging lever 131 is rotatably connected with a hole 61a which is provided at an end of a sub-rod 61. A hole 61b which is provided at another end of the sub-rod 61 is rotatably connected with the coupling pin 32 which is provided by the second swinging lever 132. Because the sub-rod 61 is sandwiched between the first swinging lever 131 and the second swinging lever 132, the sub-rod 61 has a slot-shaped grease reservoir 61c provided therein to slide well and lighten. The other structural parts and construction are identical with those of the sixth embodiment.

Figure 16:
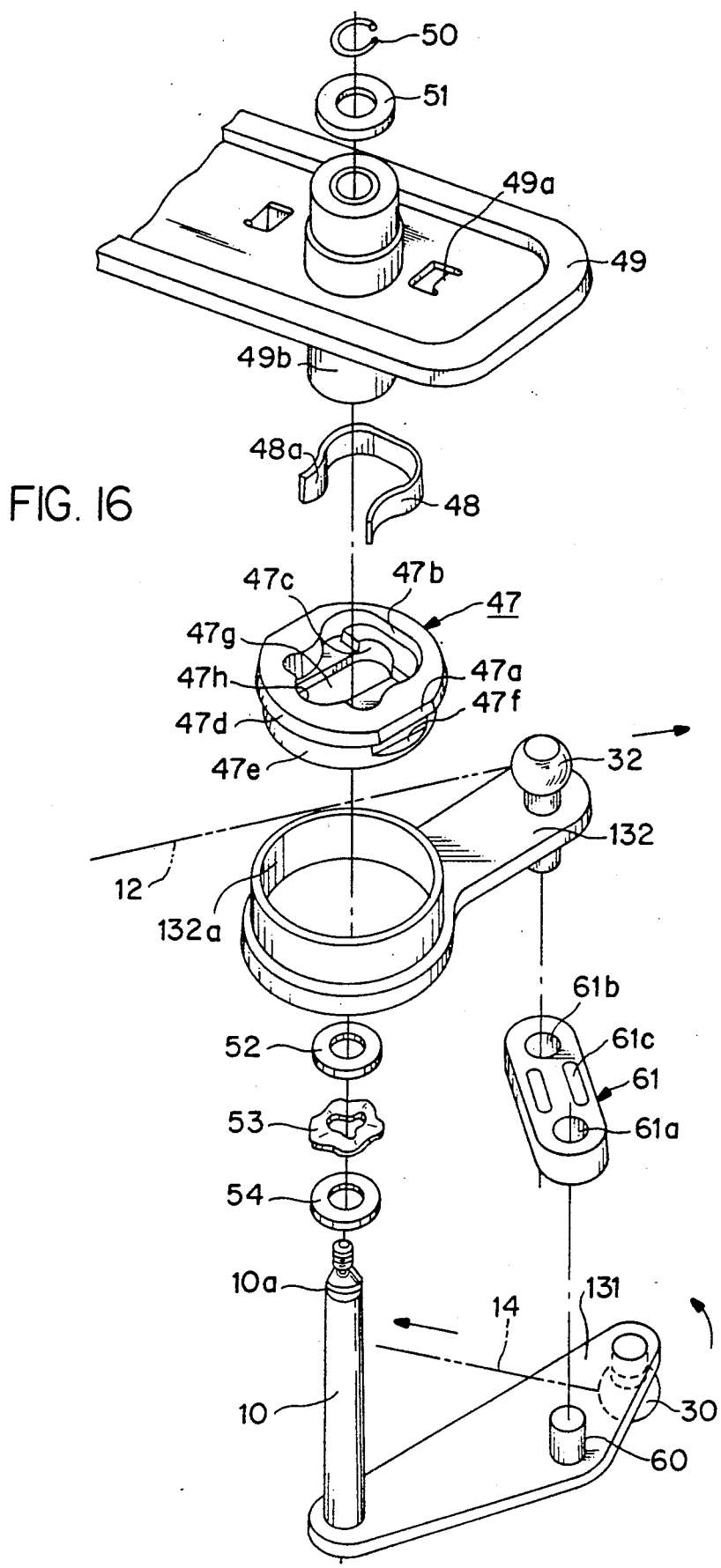
FIG. 16 is an exploded perspective view illustrating structure parts and the construction of the wiper device of a seventh embodiment of the present invention.
Figure 17:
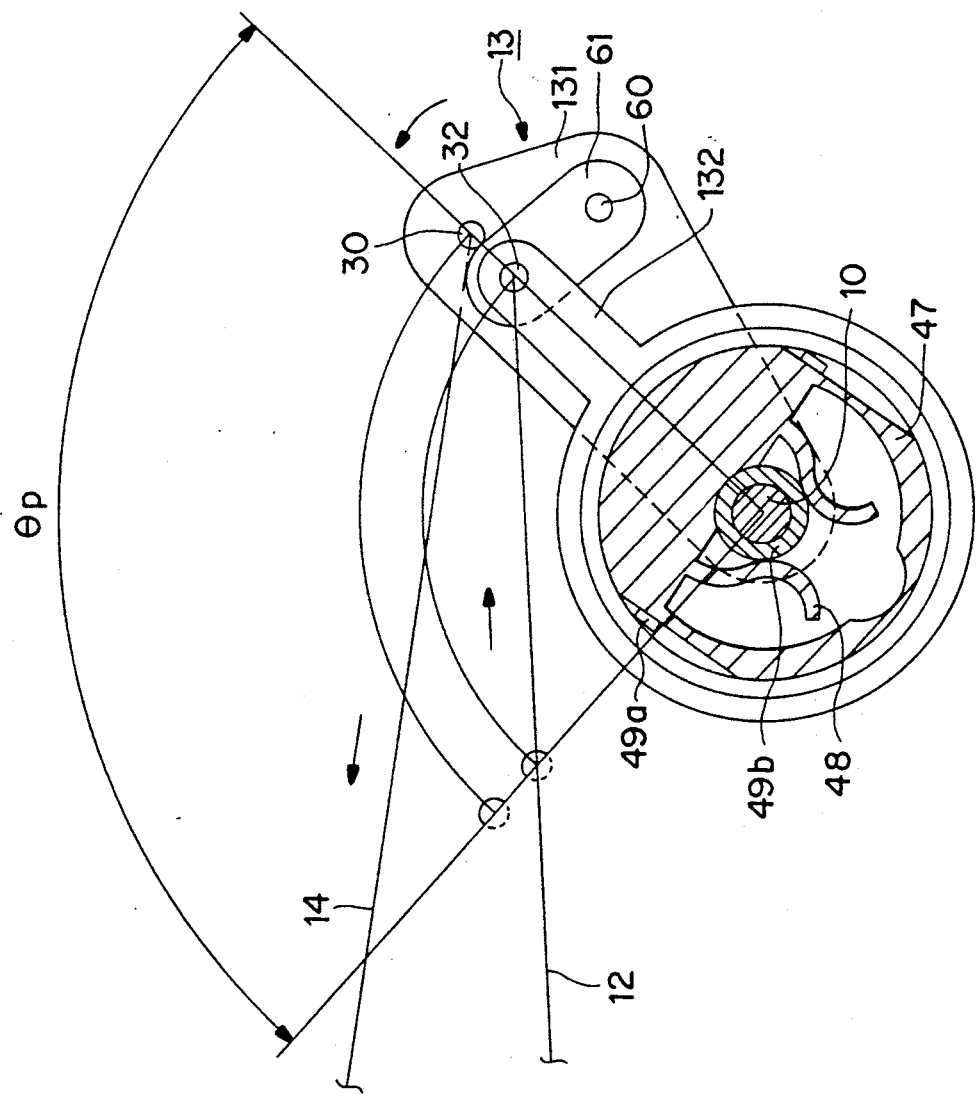
FIG. 17 is a partly sectional plan view illustrating the fully concealed mode around the pivot shaft in the seventh embodiment.
Figure 18:
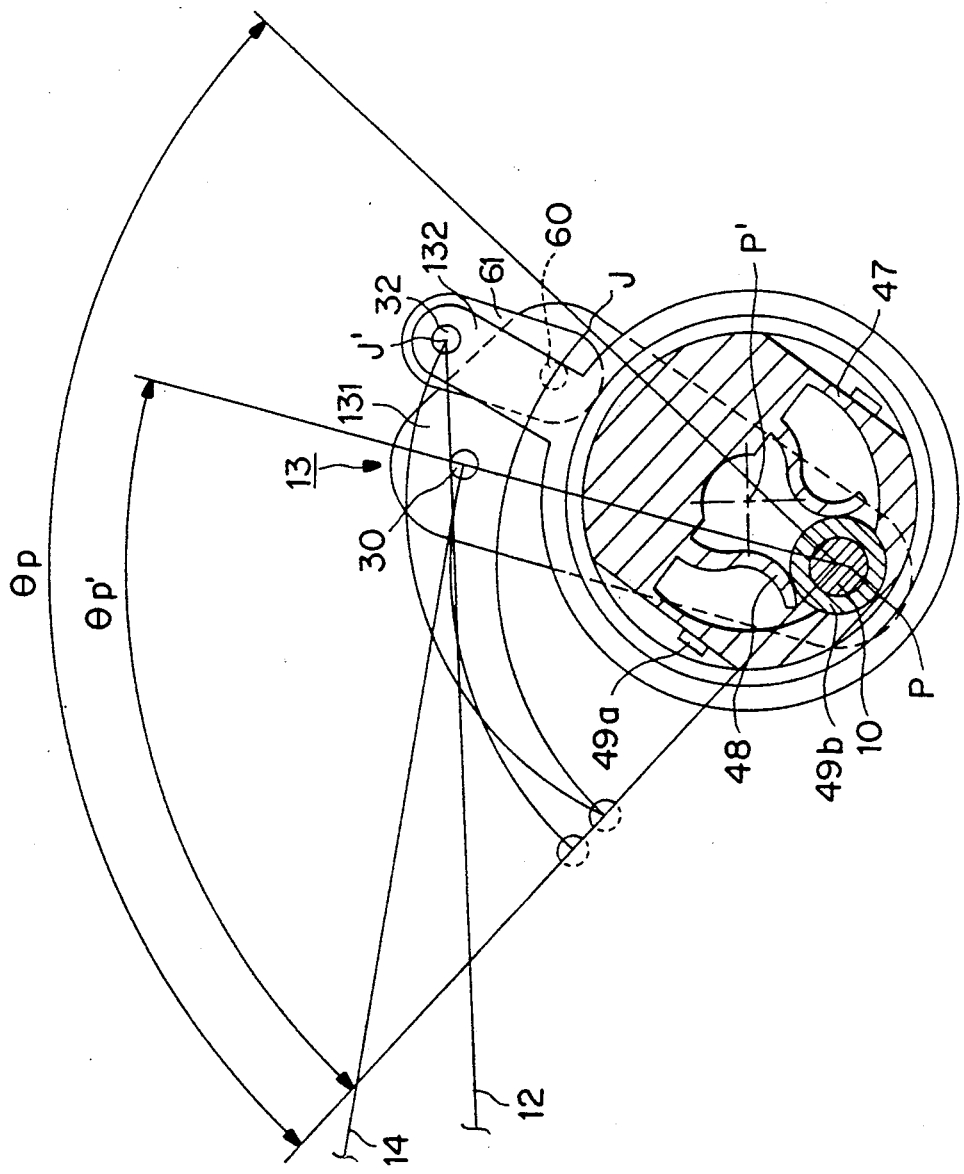
FIG. 18 is a partly sectional plan view illustrating the semi-concealed mode around the pivot shaft in the seventh embodiment.

Next, an actuation of the seventh embodiment is described in accordance with FIGS. 16 to 18. FIG. 17 illustrates the fully concealed mode in the warm climates. Angle $\theta p$ shows the wiping angle in the fully concealed mode. FIG. 17 illustrates only the periphery of the passenger's side pivot shaft 10. The wiping angle is switched on the driver's side as well on the passenger's side. When the driver's side wiper arm 4A (see FIG. 1) has a load applied thereto upward by the snow or a hand, the link rod 14 has the tractive force applied thereto in the left in illustration of FIG. 17. The first swinging lever 131 is pulled by the link rod 14 and tries to rotate on the pivot shaft 10 in the counterclockwise direction. However, because the second swinging lever 132 is connected to the coupling rod 12 by the coupling pin 32, the second swinging lever 132 is pushed in the right in illustration of FIG. 17, centering the linkage portion of the coupling rod 12 with the crank arm 9a due to driving force of a wiper motor 90. Then, the plate spring 48 in the support 47 provided in the other end opens, so that the second swinging lever 132 is pushed out, accompanied by the snap action. At this moment, the sub-rod 61 which is coupled with the second swinging lever 132 rotates on the pin shaft 60 provided in the first swinging lever 131 in the clockwise direction. The moving direction of the support 47 is limited to the direction connecting the points P and P' by the stopper portion 49a provided in the holder body 49, therefore the support 47 slides in a fixed direction. As a result thereof, the wiping angle is switched from $\theta p$ to $\theta p'$ by sliding of the support 47 in the same manner with the sixth embodiment. FIG. 18 illustrates the semi-concealed mode which results from switching of the wiping angle. After movement of the second swinging lever 132, a holder portion 49b is restrained and fixed in the stopper portion 47h. Therefore, after movement of the second swinging lever 132, the swinging center of the second swinging lever 132 moves from point P to point P' in illustration of FIG. 18. Because a center position of the coupling pin 32 which is connected with the coupling rod 12 moves from point J to point J' and the distance is increased between the point P being the center position of the pivot shaft 10 and the point J' being the center position of the coupling pin 32, the wiping angle is reduced and is switched from $\theta p$ in the fully concealed mode to $\theta p'$ in the semi-concealed mode. In the fully concealed mode, the first swinging lever 131 and the second swinging lever 132 rotates on the point P. In the semi-concealed mode, the first swinging lever 131 also rotates on the point P, whereas only the second swinging lever 132 rotates on the point P'. The swinging of the sub-rod 61 on the pin shaft 60 eliminates a difference in locus between the both swinging levers 131 and 132 which rotate on the different points.

According to the sixth and the seventh embodiments, there is advantage in that the wiper device can be protected without manual switching operations because the wiping angle is switched automatically when the snow accumulates to the wiper-blade housed position. Moreover, there is another advantage in that the wiping angle can be manually switched by a simple operation at one touch in case of manual switching.

(Eighth to Fifteenth Embodiment)

Figure 19A:
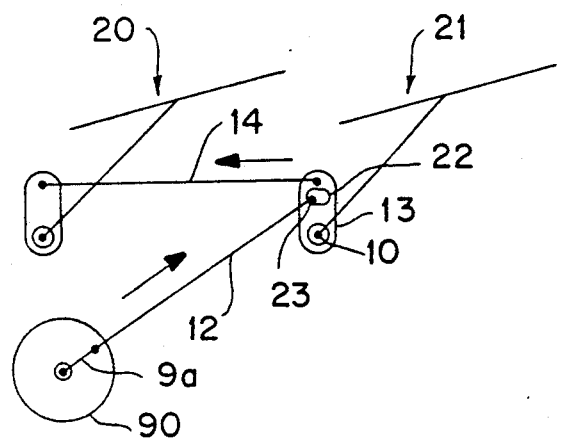
FIG. 19($a$) to FIG. 19($h$) are illustration views illustrating eighth to fifteenth embodiments of the present invention.

In an eighth embodiment as illustrated in FIG. 19(a), a wiper device of the present invention is applied to a wiper device for a right steering wheel. In the eighth embodiment, a coupling rod 12 is coupled with a passenger's side 21 swinging lever 13, and the lever 13 swings over a pivot shaft 10. A fully concealed mode 23 is switched to a semi-concealed mode 22 by a tractive force applied to a link rod 14 where the passenger's side 21 and driver's side 20 swinging levers 13 and 13A are coupled.

Figure 19B:
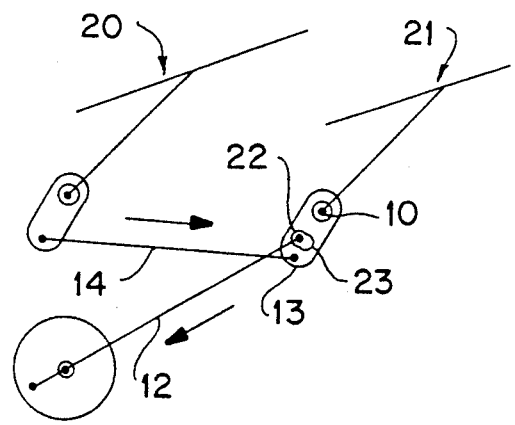

In a ninth embodiment as illustrated in FIG. 19(b), the wiper device of the present invention is applied to the wiper device for the right steering wheel. In the ninth embodiment, the coupling rod 12 is coupled with the passenger's side swinging lever 13 and the lever 13 swings under the pivot shaft 10. The fully concealed mode is switched to the semi-concealed mode by a pushing force applied to the link rod 14.

Figure 19C:
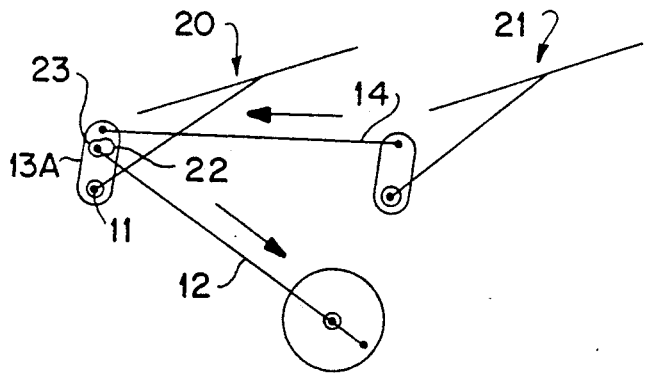

In a tenth embodiment as illustrated in FIG. 19(c), the wiper device of the present invention is applied to the wiper device for the right steering wheel. In the tenth embodiment, the coupling rod 12 is coupled with the driver's side swinging lever 13A and the lever 13A swings over the pivot shaft 11. The fully concealed mode is switched to the semi-concealed mode by the pushing force applied to the link rod 14.

Figure 19D:
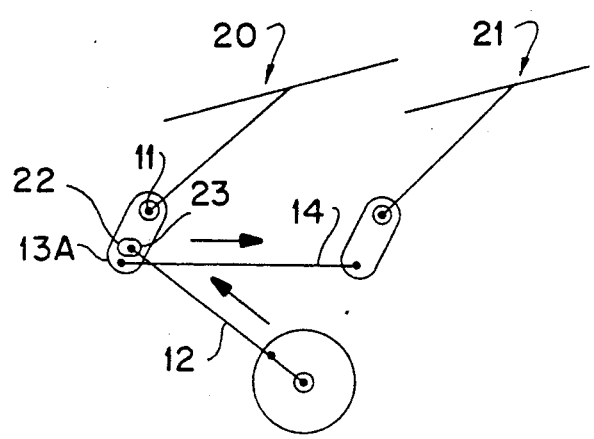

In an eleventh embodiment as illustrated in FIG. 19(d), the wiper device of the present invention is applied to the wiper device for the right steering wheel. In the eleventh embodiment, the coupling rod 12 is coupled with the driver's side swinging lever 13A and the lever 13A swings under the pivot shaft 11. The fully concealed mode is switched to the semi-concealed mode by the tractive force applied to the link rod 14.

Figure 19E:
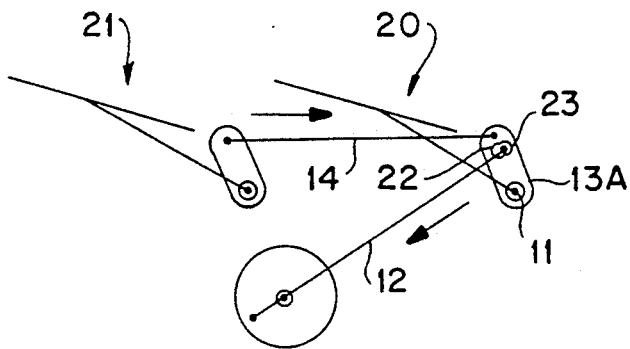
Figure 19F:
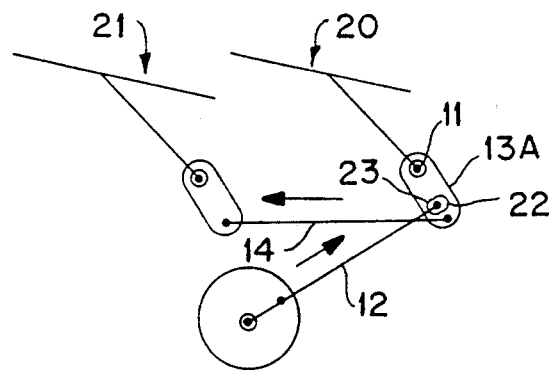
Figure 19G:
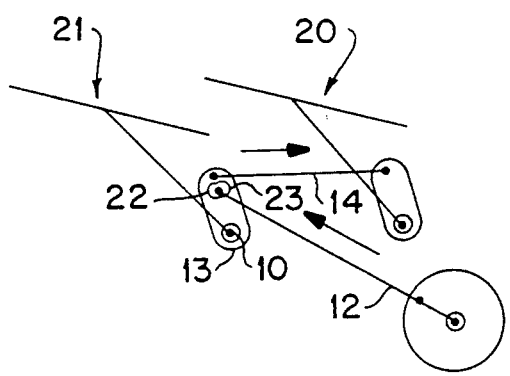

In a twelfth embodiment as illustrated in FIG. 19(e), the wiper device of the present invention is applied to the wiper device for the left steering wheel. In the twelfth embodiment, the coupling rod 12 is coupled with the driver's side swinging lever 13A and the lever 13A swings over the pivot shaft 11. The fully concealed mode is switched to the semi-concealed mode by the pushing force applied to the link rod 14.

In a thirteenth embodiment as illustrated in FIG. 19 (f), the wiper device of the present invention is applied to the wiper device for the left steering wheel. In the thirteenth embodiment, the coupling rod 12 is coupled with the driver's side swinging lever 13A and the lever 13A swings under the pivot shaft 11. The fully concealed mode is switched to the semi-concealed mode by the tractive force applied to the link rod 14.

In a fourteenth embodiment as illustrated in FIG. 19 (g), the wiper device of the present invention is applied to the wiper device for the left steering wheel. In the fourteenth embodiment, the coupling rod 12 is coupled with the passenger's side swinging lever 13 and the lever 13 swings over the pivot shaft 10. The fully concealed mode is switched to the semi-concealed mode by the tractive force applied to the link rod 14.

Figure 19H:
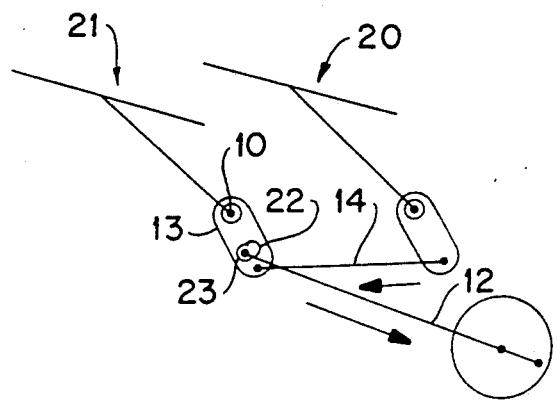

In a fifteenth embodiment as illustrated in FIG. 19(h), the wiper device of the present invention is applied to the wiper device for the left steering wheel. In the fifteenth embodiment, the coupling rod 12 is coupled with the passenger's side swinging lever 13 and the lever 13 swings under the pivot shaft 10. The fully concealed mode is switched to the semi-concealed mode by the pushing force applied to the link rod 14.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A wiper device including a wiper motor and two wiper blades for wiping a vehicle windshield comprising a reciprocally actuating coupling rod connected to the wiper motor by a crank arm, a swinging lever which is connected to the coupling rod by a coupling pin so as to swing, said swinging lever including a switching lever which is switchable in two stable positions as well as fixedly connected with the coupling pin coupled with the coupling rod, means for enabling movement of the coupling pin with respect to the swinging lever, accompanied by a snap action, a slider which maintains slidability of the switching lever with the swinging lever, such that the slider can move accompanied by the snap action relative to the swinging lever, a first wiper arm which is fixedly connected with one of the wiper blades and is swung with the swinging lever, and a second wiper arm which is fixedly connected with another of the wiper blades and swings in tandem with the first wiper arm according to reciprocal movement of a link rod connected to the swinging lever.

2. The wiper device as defined in claim 1, wherein the slider is slidably maintained between two guides rising from the swinging lever.

* * * * *